(12) United States Patent
Kogge

(10) Patent No.: US 9,106,440 B2
(45) Date of Patent: Aug. 11, 2015

(54) INTERCONNECT TOPOLOGY WITH REDUCED IMPLEMENTATION REQUIREMENTS

(75) Inventor: Peter M. Kogge, Granger, IN (US)

(73) Assignee: EMU SOLUTIONS, INC., South Bend, IN (US)

(*) Notice: Subject to any disclaimer, the term of this patent is extended or adjusted under 35 U.S.C. 154(b) by 136 days.

(21) Appl. No.: 13/585,410

(22) Filed: Aug. 14, 2012

(65) Prior Publication Data

US 2013/0044588 A1    Feb. 21, 2013

Related U.S. Application Data

(60) Provisional application No. 61/523,520, filed on Aug. 15, 2011.

(51) Int. Cl.
| | |
|---|---|
| H04L 12/28 | (2006.01) |
| H04L 12/42 | (2006.01) |
| H04L 12/721 | (2013.01) |
| H04L 12/751 | (2013.01) |
| H04L 12/753 | (2013.01) |

(52) U.S. Cl.
CPC ............... *H04L 12/42* (2013.01); *H04L 45/02* (2013.01); *H04L 45/06* (2013.01); *H04L 45/48* (2013.01)

(58) Field of Classification Search
CPC ....... H04L 12/42; H04L 12/437; H04L 45/02; H04L 41/12; H04L 12/44; H04L 12/2602; H04L 12/46; H04L 12/4637
USPC ......... 370/216, 401, 256, 258, 223, 219, 404, 370/403
See application file for complete search history.

(56) References Cited

U.S. PATENT DOCUMENTS

| | | | | |
|---|---|---|---|---|
| 7,054,264 | B2* | 5/2006 | Mor ............................. | 370/223 |
| 7,602,706 | B1* | 10/2009 | Gardo et al. .................. | 370/219 |
| 7,778,259 | B1* | 8/2010 | Mahalingaiah ............... | 370/401 |
| 2002/0064166 | A1* | 5/2002 | Suetsugu et al. ............. | 370/403 |
| 2003/0117946 | A1* | 6/2003 | Fontana et al. ............... | 370/216 |
| 2003/0118041 | A1* | 6/2003 | Fontana et al. ............... | 370/404 |
| 2006/0109802 | A1* | 5/2006 | Zelig et al. ................... | 370/258 |

* cited by examiner

*Primary Examiner* — Kwang B Yao
*Assistant Examiner* — Syed M Bokhari
(74) *Attorney, Agent, or Firm* — Gesmer Updegrove LLP

(57) ABSTRACT

A topology for routing message traffic between interconnecting nodes of a network is provided that includes a plurality of rings having a plurality of interconnecting nodes. A number of trees include at least one leaf at a same relative position of the rings. The trees and the rings form a unique combination that provides superior network performance for moderate numbers of the interconnecting nodes, wherein each interconnecting node has only a limited ability to handle a plurality of links.

22 Claims, 7 Drawing Sheets

Figure 2

| | Parameters | # Nodes | Node Degree | Diameter | Average Distance | Bisection Bandwidth (in eqvt links) |
|---|---|---|---|---|---|---|
| Star | F: degree of root | 1 switch<br>F leaves | F: switch<br>1: leaves | 2 | (F-1)/F | F/2 |
| Ring | C: # nodes | C | 2 | int(C/2) | int($C^2$/4)/C | 2 |
| 2D Torus | X1: 1st dimension<br>X2: 2nd dimension | X1*X2 | 4 | int(X1/2)<br>+int(X2/2) | int($X1^2$/4)/X1<br>+int($X2^2$/4)/X2 | 2*min(X1,X2) |
| 3D Torus | X1: 1st dimension<br>X2: 2nd dimension<br>X3: 3rd dimension | X1*X2*X3 | 6 | int(X1/2)<br>+int(X2/2)<br>+int(X3/2) | int($X1^2$/4)/X1<br>+int($X2^2$/4)/X2<br>+int($X3^2$/4)/X3 | 2*min(X1*X2,<br>X1*X3,<br>X2*X3) |
| Tree | F: switch fanout<br>L: # levels | $F^L$-1: switches<br>$F^L$: leaves | F+1: switches<br>1: leaves | 2L | | F/2 |
| Fat Tree | F: switch fanout<br>L: # levels<br>W[i]: width of level i-1 to i links | $F^L$-1: switches<br>$F^L$: leaves | F+1: switches<br>1: leaves | 2L | | W[1]*F/2 |
| TreeRing | R: # rings<br>C: # nodes/ring | R*C | R: Switch nodes<br>3: Ring nodes | int(C/2)+2 | int($C^2$/4)/C<br>+2(R-1)/R | 2R |

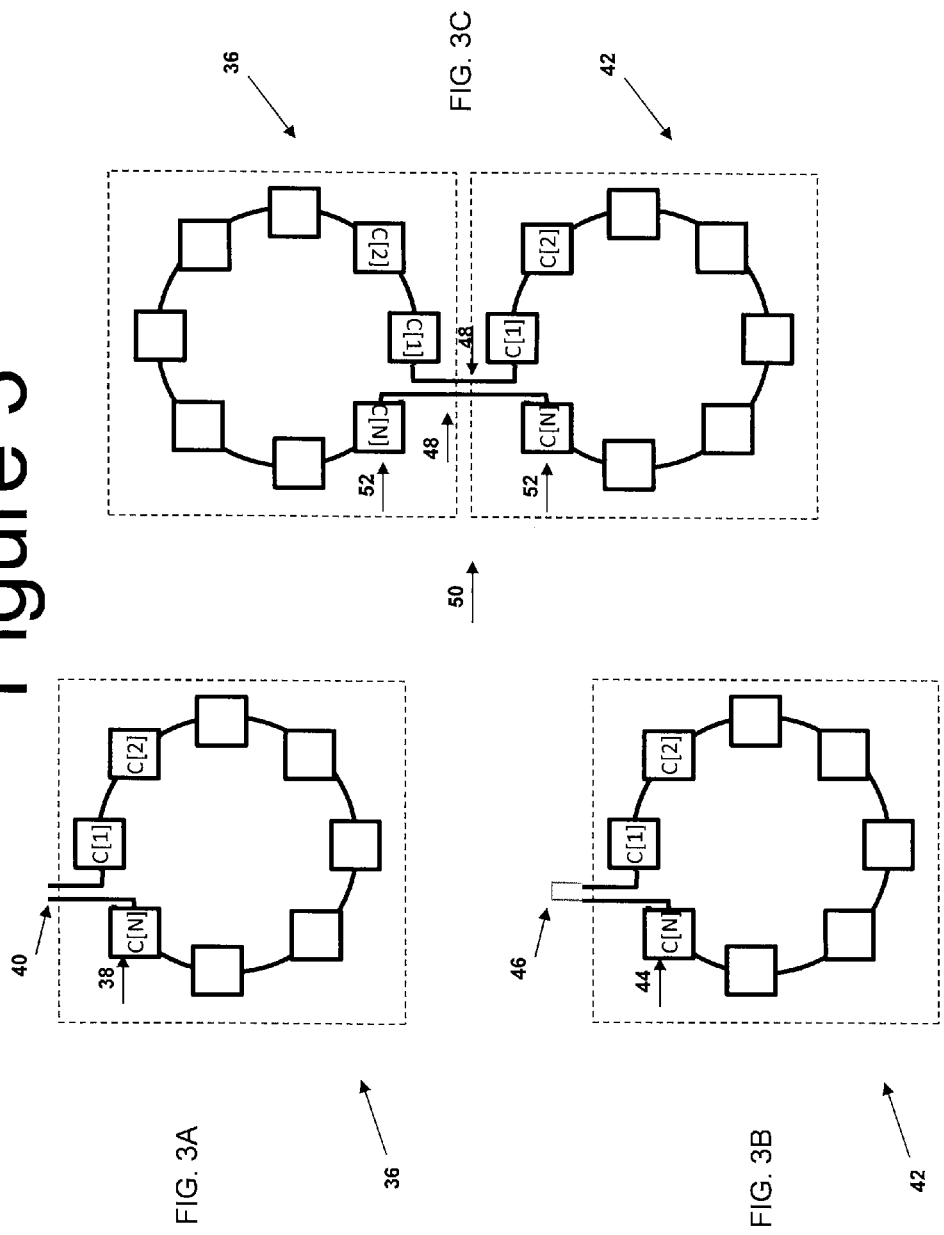

INTERCONNECT TOPOLOGY WITH REDUCED IMPLEMENTATION REQUIREMENTS

PRIORITY INFORMATION

This application claims priority from provisional application Ser. No. 61/523,520 filed Aug. 15, 2011, which is incorporated herein by reference in their entirety.

BACKGROUND OF THE INVENTION

The invention is related to the field of topology, and in particular to nodes and links of an interconnection network's topology.

Most modern parallel computers are designed with multiple "nodes," each of which is capable of some independent action. These nodes must communicate with each other, typically over what is called an "interconnection network," which in turn is built from a set of "links" that connect the nodes. The arrangement of links and nodes is called the network's "topology." The design of such topologies incorporates such features as how many nodes can be connected to any one link, how is routing of messages on such networks performed, and what is the protocol used for both injecting new messages into the system, from link to link, and out of the network at the appropriate target node. Typical topologies include bus, star, tree, ring, mesh, and crossbar.

A key question for the choice of a particular topology for a system is the implementation cost as seen in its totality. This cost, typically computed as a function of the number of nodes that are interconnected, is then traded against performance metrics for communication patterns of actual traffic. Topologies are preferred that lower costs for acceptable performance for the span of node counts of relevance to the target systems.

SUMMARY OF THE INVENTION

According to one aspect of the invention, there is provided a topology for routing message traffic between interconnecting nodes of a network. The topology includes a plurality of rings having a plurality of interconnecting nodes. A number of trees include at least one leaf at a same relative position of the rings. The trees and the rings form a unique combination that provides superior network performance for moderate numbers of the interconnecting nodes, wherein each interconnecting node has only a limited ability to handle a plurality of links.

According to another aspect of the invention, there is provided a method of routing message traffic between interconnecting nodes of a network. The method includes defining a plurality of rings having a plurality of the interconnecting nodes. Also, the method includes defining a plurality of trees having at least one leaf at a same relative position of the rings. The trees and the rings form a combination for providing superior network performance for moderate numbers of the interconnecting nodes, wherein each interconnecting node has only a limited ability to handle a plurality of links.

BRIEF DESCRIPTION OF THE DRAWINGS

FIG. 2 is a table illustrating properties of various network topologies;

FIG. 3A is a schematic diagram of a system with a ring topology; FIG. 3B is a schematic diagram of another system with a ring topology; FIG. 3C is a schematic diagram of joining two copies of a system with a ring topology into a single larger system with the same ring topology;

DETAILED DESCRIPTION OF THE INVENTION

Figure 1:
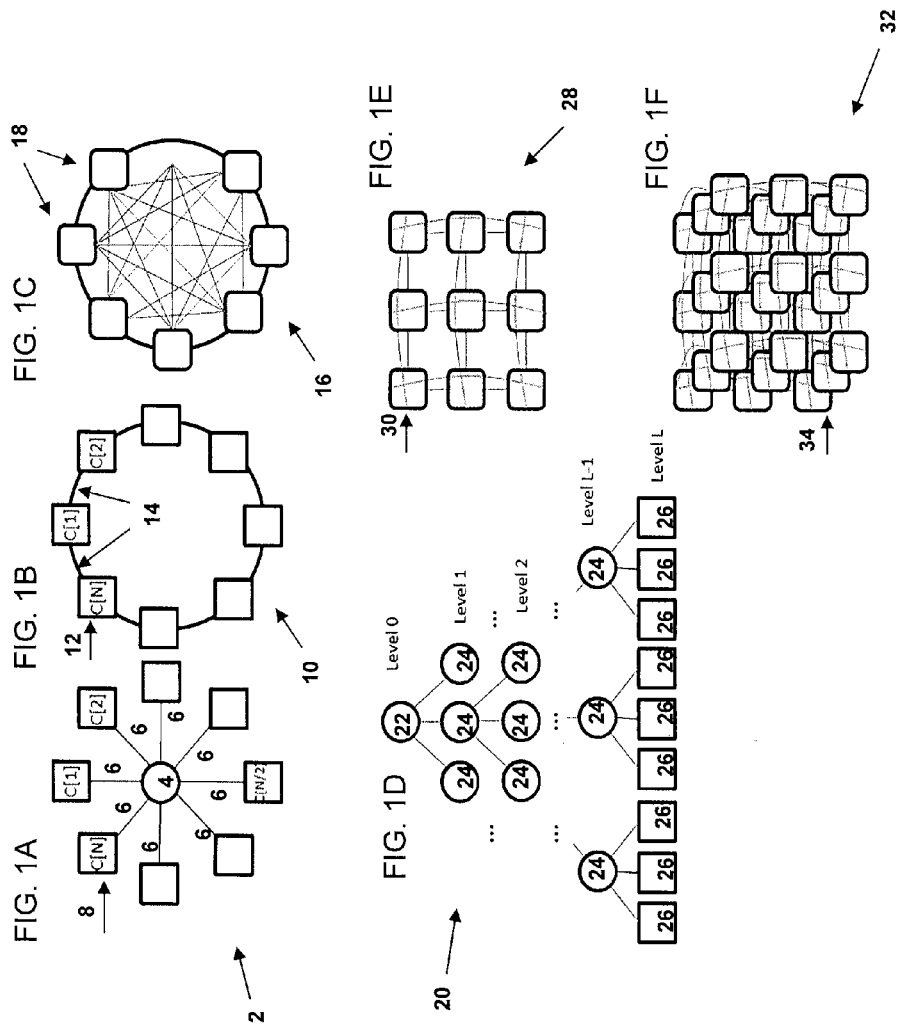
FIG. 1A is a schematic diagram illustrating a star network.
FIG. 1B is a schematic diagram illustrating a ring network.
FIG. 1C is a schematic diagram illustrating a fully connected network.
FIG. 1D is a schematic diagram illustrating a tree network.
FIG. 1E is a schematic diagram illustrating a 2D mesh network.
FIG. 1F is a schematic diagram illustrating a 3D mesh network.

Topologies of networks defined to date fall into two general categories: "bus networks" have all nodes are connected to the same link and take turns using it, and "graph networks" that have exactly two nodes connected to a link. Three kinds of nodes are typical: "endpoints" are nodes that may originate or accept messages; "switches" or "routers" do not originate or accept messages, but only route incoming messages on the correct outgoing link in the direction of the correct endpoint; and "host" nodes that are outside the normal operation of the system but provide overall control of the system by injection of messages into the system. Each node of any kind typically has some number of "ports" to which "links" can be wired to ports on other nodes.

Examples of current commodity state of the art networks include Ethernet (which uses a bus-based topology), switched Ethernet (which uses a star topology where the root does not do computation, but is a "router" or "switch" to decide how to forward incoming messages that are addressed to other nodes), Infiniband (which supports switched fabrics like fat trees and meshes), and PCI Express (which are optimized for tree protocols where the root and all sub-roots are switches, only endpoints originate or sink messages, and each endpoint has some unique range of addresses to which messages may be directed).

Relatively inexpensive commodity parts exist for star switches with dimensions up to about a dozen for protocols such as PCI Express. Many multi-node computer systems have tens of thousands of nodes, with 3D torii as a very common topology (see the IBM BlueGene and the Cray X-series). The cost of networks depends on several issues: the cost to implement each link (lanes, connectors, drivers/receivers), the cost of the logic needed to make routing decisions, the cost of the logic in the endpoints to process messages as they are are injected and/or received, the cost of additional logic needed to join multiple copies of a system to form a bigger system, the cost and complexity of inserting traffic between the networked nodes and some external host systems, where overall control of the overall system may lie, and the cost of supporting redundant communications paths, if some node or link goes down.

Many high end designs use mesh networks where a separate circuit often called a "NIC" ("Network Interface Controller") handles the interface to both all the links that make up a node of the network topology and computational logic. This includes routing for fabrics where computation and switching are found in the same node.

When such NICs are implemented as a separate chip, the number of off-chip contacts available for the links can typically range up to the hundreds. This permits nodes with both high degree and wide links (many lanes). Such chips, however, can be quite expensive, especially if only moderate numbers of relatively simple nodes are to be supported.

In contrast, if a node is to be implemented on a single chip, the number of chip I/Os to support high speed links may be limited, perhaps only a few dozen. This greatly limits both the degree and width of the links supported. Topologies with smaller degrees allow more contacts to be used per link, and thus higher link bandwidth.

A second major metric of cost is in the routing logic that must be placed in each node, which needs to decide for any possible node address how to move a message. For large node counts, this logic typically requires large routing tables and the like to decide which outgoing link should be taken when forwarding messages. Systems with high degree and complex topology have more decisions to make, especially when multiple paths to the same destination are possible within the topology.

FIG. 1A shows a topology of a star network 2, where one node (the "root") is connected to one end of all links 6, and all other compute nodes 8 (C[1], C[2], . . . C[N]) have one connection to the other end of a unique one of the links 6. In such networks 2, the root may be a switch node 4 that understands how to determine which link 6 a message should take in the outgoing direction, if it is destined for a particular node 8. FIG. 1B shows a topology of a ring network 10, where there is no root; rather, each of the compute nodes 12 (C[1], C[2], . . . C[N]) has two links 14, with node 12 N connected to nodes N−1 and N+1 (modulo N). If you travel far enough (C−1) links in either direction, you will reach your own node 12. FIG. 1C shows a topology of a fully connected network 16, where each of the nodes 18, a combined switch/compute node, has N−1 links, with each link ending at one of the other N−1 nodes. FIG. 1D shows a topology of a tree network 20, where there is a unique root 22 said to be at level 0 that has a set of links that go to some other set of child nodes 24, which may be switch nodes, said to be at level 1, some of which may themselves be roots of further sub-trees, and where any node, which may be a compute node 26 at level L, may have exactly one link to level L−1, no links to any other node at level L, and all other links to nodes at level L+1. These nodes 26 at the ends are termed "leaves." FIG. 1E shows a topology of a 2D mesh network 28, where each node 30, which may be a combined switch/compute node, has the same number of links connected to it, typically a number 2D, where D is called the "dimension" of the network and where each node 30 is connected in each of D directions to two nodes 30 that "precede" and "follow" the node 30 in that dimensional ordering. In such networks 28, nodes 30 typically have both switching and computing capabilities. FIG. 1F shows a topology of a 3D mesh network 32, where each node 34 may be a combined switch/compute node.

Fat tree networks (not shown) are similar to tree networks 20 except that as one moves up the tree towards the root, the links get "wider," and are capable of carrying more information than links closer to the leaves 26. Torus networks (not shown) are meshes where the edges are "wrapped around" as in a ring. Further, multi-stage interconnect networks (MINs) (not shown) comprise of stages of interior nodes that are just switches. In general, such topologies appear to the endpoints are cross-bar like, in that any set of pairs of endpoint nodes can be in communication with each other at the same time. For stars, trees, and MINs, the nodes are typically separated between those that do pure routing (switches or "internal nodes"), and those that initiate or terminate messages (leaves). In most of the other topologies, the nodes contain both routing and computational facilities.

FIG. 2 shows formulas for many of the characteristics for several topologies. Typical topology properties that have been used as evaluation metrics in computer systems include: the "link bandwidth" is the speed at which data may be transferred across a link, typically measured in bytes per second. For electrical links, this is affected both by the speed of data transmission on one wire (or "lane"), and the number of lanes. The "degree" is the number of ports on a node to which links may be added. The "diameter" is the largest distance in link traversals between any two nodes. The "average distance" is the average number of links that must be traversed to get from one randomly selected node and another random node. With respect to the "bisection bandwidth", if the system is divided into two equal-sized sets of nodes, the bisection bandwidth is the minimum aggregate bandwidth of all the links that traverse between the two sets. The "injection rate" is the peak rate at which a node can inject messages into the network before some link reaches saturation. This rate is typically stated in terms of some pattern of traffic, such as "all-to-all" or "broadcast", where each node tries to send a message to all other nodes, or such as "any-to-any", where all nodes are continually trying to send data to randomly selected other nodes. Importantly, the TreeRing topology used in accordance with the invention includes R*C nodes, where R is the number of rings and C is nodes/ring, with a diameter of $int(C/2)+2$ and an average distance of $int(C^2/4)/C+2(R-1)/R$.

It is often advantageous to take several copies of a system and combine them in some fashion to create a larger system. Costs here fall in two categories. The first is in the ability to insert "splices" into a topology so that two copies can be joined by simply wiring between the copies. FIG. 3A shows a system 36 with a ring topology and N nodes 38. A "splice" would bring the edges of one or more links out to a connector 40 at an end of the system 36, splitting the ring. FIG. 3B shows a copy of another system 42 with a ring topology and N nodes 34. Another "splice" would bring the edges of one or more links out to a connector 46 at an end of the system 42, splitting the ring. In FIG. 3A and FIG. 3B, this splice is between node N and 1. If only one copy of the system, either 36 or 42, is needed, a "jumper" across this splice can complete the ring. If two copies of systems, such as 36 and 42, are desired to be joined, then the jumpers are replaced by links 48 between the two copies of the system, 36 and 42, as shown in FIG. 3C. The result is a single ring 50 with twice as many nodes as a single copy. This TreeRing topology 50 takes advantage of the simplicity of rings and the availability of inexpensive switches of moderate degree. As shown in FIG. 3C, the TreeRing topology 50 in its simplest embodiment has R rings of computational nodes, with C computational nodes 52 in each of these rings, for a total of RC nodes. Each node is labeled as N[r,c], where r is which ring the node is on, and c is the relative position of the nodes in the ring.

Other topologies that share this characteristic of being able to simply rewire splice connections to get systems with the same topology but more nodes include the torii, although in these cases the number of splices may be significant (twice the number of nodes on one of the faces of the topology), and simply convert the torus into a mesh unless jumpers are installed.

Other topologies such as stars 2, trees 20 and fat trees require more than just splices and jumpers. First, it is likely that at least one extra link be made available to some of the nodes, such as the root in the star 2 or tree 20. If it is not necessary to preserve the topology, then two copies of the system can be joined by simply joining matching ports on two copies with an external link. If, however, the topology is to be maintained, the design typically requires either replacing some node with one of higher degree (star 2), or adding extra external nodes to the combination (as in joining multiple copies of trees 20 requires a tree 20 of switch nodes 24 whose leaves 26 equals the number of copies to be joined).

Another implementation cost is in how easy is it to insert one or more links into a system using a topology to allow message flow between the system and some external "host." Such messages typically are used for control and monitoring. For systems like stars, trees and fat trees, it is straightforward to include an extra port on the root switch node for such functions, and then wire a link to the host. For other topologies, such as meshes, torii, and MIN, there is no distinguished node to which an extra link can be added without disturbing the symmetry of the design.

Providing redundancy is important to many real systems. For topologies such as rings 10, meshes, and torii, at least some number of nodes or links may be lost before large numbers of additional nodes become unreachable. For example, in a ring 10, if a link 14 to the next node 12 clockwise is down, the message could be routed counter clockwise. A second fault would, however, bisect the network.

Performance metrics for comparing two implementations of networks typically depend on a "traffic pattern" for the messages that traverse them. One example in particular that is of growing use is an "any-to-any" pattern, where each node that can source messages wants to inject messages as rapidly as possible, with each message designed for a node in the system which is chosen essentially randomly. All nodes are trying to do the same thing at the same time. The aggregate maximum rate at which messages can be injected into the system is then directly related to the value of the network.

The class of applications for which this is a valuable pattern includes many that deal with data analytics—the analysis of large data sets. A formal organization, termed the Graph500, has been formed that has proposed an algorithm that has this traffic property when run on a parallel computer, and rankings are announced every six months on real systems.

Estimates of such maximum injection rates can be computed analytically. For example, for meshes and torii where all links have the same bandwidth and are all equally likely to be used, this maximum injection rate may be approximated as $L*B_{peak}/D_{ave}$, where L is the total number of links, $B_{peak}$ is the maximum messages per second that a link can handle, and $D_{ave}$ is the average distance in links that a message traverses when it goes from one node to another randomly selected node. For meshes and torii, L is 2DN where D is the degree and N the number of nodes.

Figure 4:
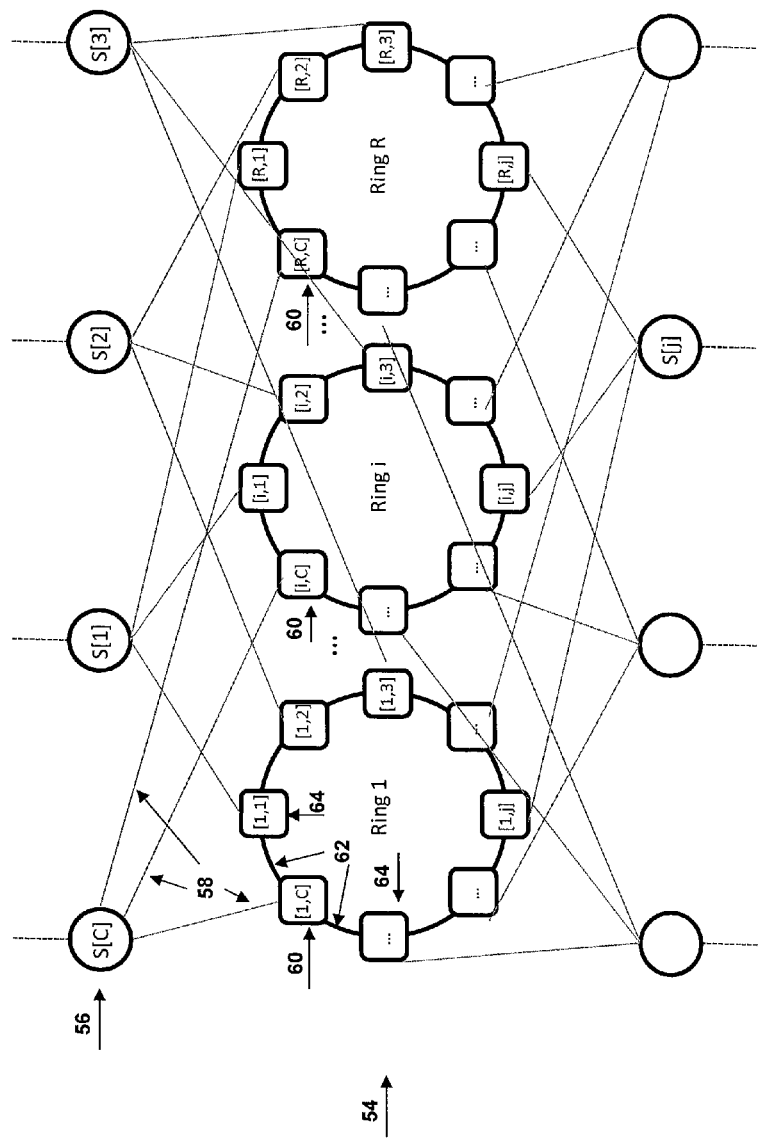
FIG. 4 is schematic diagram illustrating a tree ring topology used in accordance with the invention.

FIG. 4 shows a schematic diagram illustrating a tree ring topology 54 used in accordance with the invention. In addition, there are C star switch nodes of degree at least R, labeled nodes 56 (S[1] through S[C]). The links 58 of switch S[C] 56 go to all compute nodes 60 with position c on each ring, namely N[1,c] through N[R,c].

A variation of this topology would reduce the number of switches 56 by having one switch every c positions on the rings.

Another variation of this topology would replace the switch 56 by a tree 20, or fat tree, of switches 24 that have the same number of leaves 26 as there are positions on the ring, with the i'th leaf on tree j actually being node j on ring i.

If links to external host systems are needed, additional ports and associated links off of the switch nodes 56 can be used. If each switch node 56 has h such links, the number of links off of the system is hC. No modification to any switch node 56 on the rings is needed in any way.

As one embodiment of a routing algorithm, assume that each position on the rings has a separate switch node 56, as shown in FIG. 4. Assume node N[r1,c1] wants to send a message through the network to node N[r2,c2]. If r1 equals r2, that is both nodes are on the same ring, the message can be routed on that ring. If travel either clockwise or counterclockwise is permitted, the number of links traversed is min (c2−c1, c1+C−c2). If r1 does not equal r2, that is the target node is on a different ring, then the link leaving N[r1,c1] to switch S[c1] can be taken, and then at switch S[c1] the link down to ring r2 is taken. Once at the correct ring, travel around the ring can proceed as above. An alternative is to travel around ring r1 to position c2, and then take the switch to the correct node on the correct ring. The distance in either case is 2+min(c2−c1, c1+C−c2).

Routing from an external host node attached to switch S[c1] to node N[r2,c2] in the system takes the link into the switch to which it is connected, and from there to the correct ring, and then around the ring. This tree and then ring routing matches that articulated above, and has a distance 2+min(c2−c1, c1+C−c2).

Routing to a host with a link on switch S[c2] from node N[r1,c1] takes the path around the ring r1 to position c2, and then the link to the switch S[c2] and through to the host, with distance 2+min(c2−c1, c1+C−c2).

Routing when the switches are replaced by trees is identical, except that when a message enters the switch tree, it traverses up the tree only far enough to reach a switch node with a connection down to the correct ring.

Routing when some of the switches are not present requires traversing from N[r1,c1] along the ring r1 to the first position that has a switch link, and then over to ring r2, from which the message traverses ring r2 to position c2.

It is also possible to modify the routing to correct for a relatively large number of bad nodes or links. If a message is destined for the same ring, but hits a bad spot, it can either go around the ring in the other direction, or, if there are multiple breaks, take a tree to some other ring, traverse that ring, and come back to the current ring. If there is a bad tree, the message can take some other tree to get to the correct ring, and traverse the ring again.

Each computational node 60 has a degree of only three— two links 62 to its neighbors 64 on the ring and one link 58 to its switch 56. Assuming that messages can be directed in either direction around a ring, the diameter of a TreeRing 50 is 2+2*floor(C/2). The bisection bandwidth is computed by splitting all rings in the same two relevant positions so that the remaining half rings are equal in node counts. The bandwidth across this is 2R times the bandwidth per link. The average time to get to some node randomly chosen from all nodes in the system (including the sending node) is $(int(C/2)^2)/C+(R-1)*2/R$, where the first term is the average distance traveled around the ring and the second term is the prorated count to and from the chosen switch (when taken).

Another aspect of the invention is the ability to expand systems that use the TreeRing topology 50. Building larger systems from simple copies of smaller systems that use the TreeRing topology 50 can be done in several ways. First, if it is desirable to preserve the TreeRing topology 50 across the larger system, then each copy need only bring out a splice of each of its R rings, as shown in FIG. 3A and FIG. 3B. Assuming K copies are to be combined, the ports for the splices for the r'th ring in each copy would be wired together to form a bigger ring. Messages in the resulting system would then route using the same algorithm as before, except that the system would appear to be a single TreeRing topology 50 with R rings, each of KC nodes. If each switch has h extra ports for host nodes there would now be hRK links available for such connections. No extra hardware outside the copies of the system are needed.

It is possible to wire such splice points together in different ways than above so that other topologies may be formed. An alternative connection can also be done using the extra host ports on the switches. Clearly, if additional switch hardware is available, these links could feed into them to create systems with more rings. If additional switch hardware is deemed infeasible, then these ports can be combined directly between each other, although in this case the system topology as a whole may change.

As one example of such a combination, if M (M≤R) of these external ports are available, they could be connected to a similar port on some other copy, creating a system with M+1 copies, where there is a fully connected network joining the M+1 copies. As another example, using exactly two such ports on each copy, an arbitrarily large number of copies may be joined in a ring topology 10. If M as above is a multiple of 2, M/2 parallel rings can be constructed, providing either extra bandwidth between copies and/or redundant connections.

Each of the topologies referenced here, including the TreeRing 50, use a different set of parameters to define the topology, so a comparison of equations as in FIG. 2 is difficult. To demonstrate the advantages of the TreeRing 50, the properties of many different combinations of parameters are computed, and then plotted on the same graph, using the total number of nodes in the configuration as the x-axis value. This will often result in multiple points for the same x value, where different configurations have the same number of nodes but different properties (consider for example a 2D torus of 36 nodes: this could be implemented by a 2×18, 3×12, 4×9, or 6×6).

Figure 5:
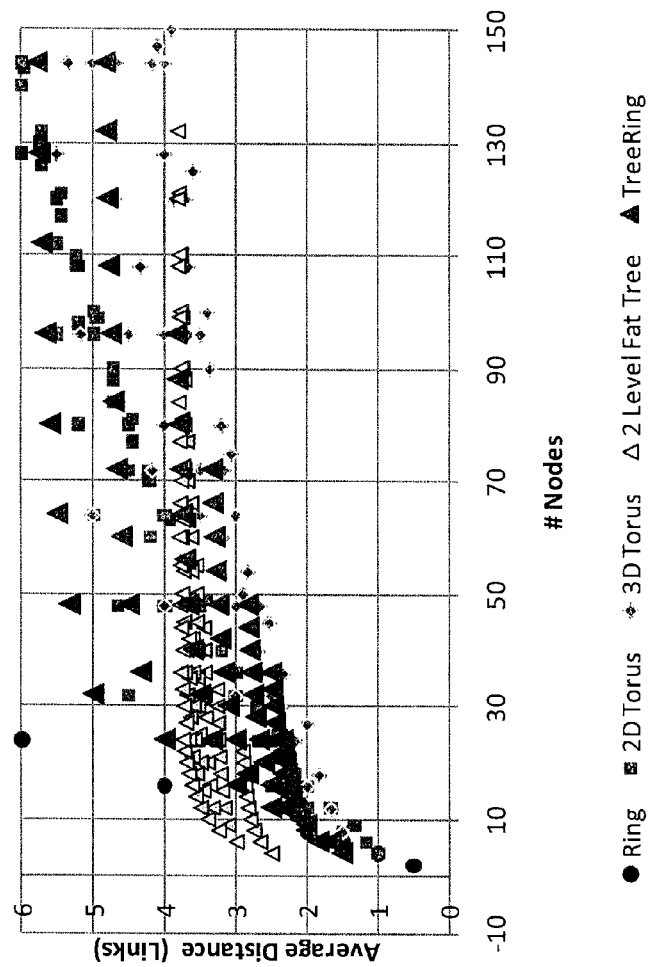
FIG. 5 is a graph comparing an average distance between nodes of various topologies for a particular design point.

FIG. 5 shows the average distance between nodes (in units of links) for a fairly exhaustive set of configurations of rings 10, 2D and 3D torii, trees (limited for simplicity to 2 levels), and TreeRings 50. Smaller y values here are considered better, as they represent configurations that require less node-to-node movements. Up to systems with around 100 nodes there are TreeRing configurations 50 that are very competitive with, and often better than, the best of the other topologies, namely 3D torii. They are poorer than 3D torii, but remain competitive up through several hundred nodes (and better than configurations for other topologies).

Figure 6:
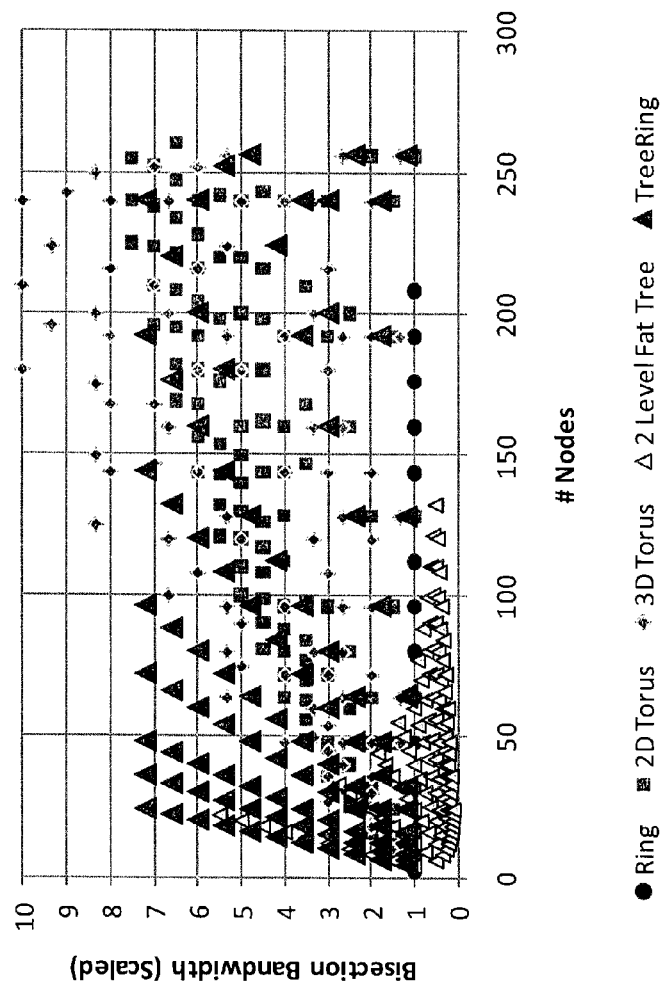
FIG. 6 is a graph comparing a bisection bandwidth for nodes of various topologies for the particular design point that was used in FIG. 5, with the added constraint that each node supports only a fixed maximum number of lanes to be distributed amongst all links that are connected to it.

FIG. 6 shows results for a bisection bandwidth for various topologies. To be fair, these configurations also constrain the total number of lanes that may be partitioned between links from a single node to a uniform constant. Thus, a 3D topology with a degree of six would have a bandwidth per link of ⅓ that of a ring, which has a degree of two. This matches the characteristics of many node implementation technologies where there is some limit on the number of high speed I/Os that may be used. The results in FIG. 6 indicate that, again, up to around 100 nodes, there are many TreeRing configurations 50 that are superior, often very superior, to any other configuration for any of the other topologies at the same node count.

Figure 7:
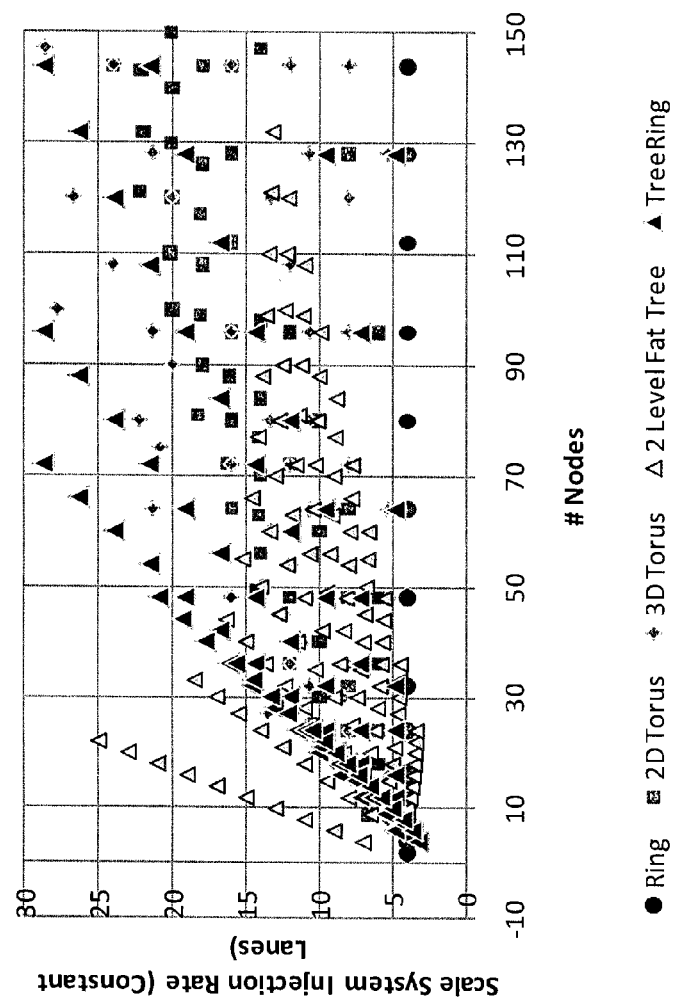
FIG. 7 is a graph comparing a peak injection rate for various topologies from all nodes in a system for the any-to-any pattern.

FIG. 7 shows the maximum injection rate possible from all nodes in a system for the any-to-any pattern of messages. In this case, TreeRing configurations 50 can, again, be found that are superior to any of the other topologies from the range of about 30 to 100 nodes. Larger y axis values are considered better.

Although the present invention has been shown and described with respect to several preferred embodiments thereof, various changes, omissions and additions to the form and detail thereof, may be made therein, without departing from the spirit and scope of the invention.

What is claimed is:

1. A topology for routing message traffic between interconnecting nodes of a network, comprising: a plurality of rings having a plurality of said interconnecting nodes; and a plurality of trees having at least one leaf at a same relative position of said rings, said trees and said rings form a unique combination that provides superior network performance for moderate numbers of said interconnecting nodes, where each interconnecting node has only a limited ability to handle a plurality of links, the unique combination is amenable to supporting links to external nodes that serve as control or monitoring points where multiple copies of the unique topology are interconnected to form a larger interconnected topology without requiring additional networking hardware, wherein each ring includes a splice structure permitting other rings to be joined via their respective splice structures forming interconnecting nodes, a ring includes a diameter defined by $\text{int}(C/2)+2$ as well as an average distance of $\text{int}(C^2/4)/C+2(R-1)/R$ where R is the number of rings and C is the number of nodes per ring.

2. The topology of claim 1, further comprising at least one port to a root switch node of said tree to support said links to an external host system and to support said links to a copy of said topology.

3. The topology of claim 1, further comprising at least one splice point inserted in said rings.

4. The topology of claim 3, wherein said splice points are wired together in said same relative position into a larger ring so as to allow multiple copies of a same design to be configured into a larger system with said topology.

5. The topology of claim 1, wherein a plurality of copies of a different design are interconnected together by using at least one link from a root of said tree so as to allow multiple copies of a same design to be configured into a larger system without using external switching logic.

6. The topology of claim 1, further comprising external links of each of a root of said tree that are connected using external switching logic so as to allow multiple copies of a same design to be configured into a larger system.

7. The topology of claim 1, further comprising a combination of a first movement between two different rings using said links of said trees, and a second movement between two interconnecting nodes on said rings using said links of said rings.

8. The topology of claim 7, wherein said combination is performed before or after a required tree movement.

9. The topology of claim 7, wherein said combination takes a failure into account in said ring by routing in either direction around said ring or by moving across to a less faulty ring, traversing said faulty ring, and returning to a desired ring beyond a break.

10. The topology of claim 7, wherein said combination takes a failure into account in one or more said trees by moving on a source ring to a different non-faulty tree, taking said different tree to a correct ring, and then moving around said correct ring to a correct destination.

11. The topology of claim 7, wherein said combination provides support when a failure is present in both said trees and said rings.

12. A method for routing message traffic between interconnecting nodes of a network, comprising the steps of: defining a plurality of rings having a plurality of said interconnecting nodes; and defining a plurality of trees having at least one leaf at a same relative position of said rings, said trees and said rings form a combination for providing superior network performance for moderate numbers of said interconnecting nodes, wherein each interconnecting node has only a limited ability to handle a plurality of links, the unique combination is amenable to supporting links to external nodes that serve as control or monitoring points where multiple copies of the unique topology are interconnected to form a larger interconnected topology without requiring additional networking hardware, wherein each ring includes a splice structure permitting other rings to be joined via their respective splice structures forming interconnecting nodes, a ring includes a diameter defined by $int(C/2)+2$ as well as an average distance of $int(C^2/4)/C+2(R-1)/R$ where R is the number of rings and C is the number of nodes per ring.

13. The method of claim 12, further comprising at least one port to a root switch node of said tree for supporting said links to an external host system and for supporting said links to a copy of said topology.

14. The method of claim 12, further comprising the step of inserting at least one splice point in said rings.

15. The method of claim 14, further comprising the step of wiring said splice points together in said same relative position into a larger ring so as to allow multiple copies of a same design to be configured into a larger system with said topology.

16. The method of claim 12, further comprising the step of interconnecting a plurality of copies of a different design together by using at least one link from a root of said tree so as to allow multiple copies of a same design to be configured into a larger system without using external switching logic.

17. The method of claim 12, further comprising the step of connecting a plurality of external links of each of a root of said tree using external switching logic so as to allow multiple copies of a same design to be configured into a larger system.

18. The method of claim 12, further comprising a combination of a first movement between two different rings using said links of said trees, and a second movement between two interconnecting nodes on said rings using said links of said rings.

19. The method of claim 18, wherein said combination is performed before or after a required tree movement.

20. The method of claim 18, wherein said combination takes a failure into account in said ring by routing in either direction around said ring or by moving across to a less faulty ring, traversing said faulty ring, and returning to a desired ring beyond a break.

21. The method of claim 18, wherein said combination takes a failure into account in one or more said trees by moving on a source ring to a different non-faulty tree, taking said different tree to a correct ring, and then moving around said correct ring to a correct destination.

22. The method of claim 18, wherein said combination provides support when a failure is present in both said trees and said rings.

* * * * *